US010132390B2

(12) United States Patent
Gunton (10) Patent No.: US 10,132,390 B2
(45) Date of Patent: Nov. 20, 2018

(54) DRIVE ARRANGEMENT (71) Applicant: Bruce Stanley Gunton, Staffordshire (GB)

(72) Inventor: Bruce Stanley Gunton, Staffordshire (GB)

(*) Notice: Subject to any disclaimer, the term of this patent is extended or adjusted under 35 U.S.C. 154(b) by 234 days.

(21) Appl. No.: 15/352,136

(22) Filed: Nov. 15, 2016

(65) Prior Publication Data

US 2018/0135733 A1 May 17, 2018

(51) Int. Cl.
*F16H 7/14* (2006.01)
*F16H 7/22* (2006.01)
*F16H 7/12* (2006.01)
*F16H 7/02* (2006.01)
*F16H 7/08* (2006.01)

(52) U.S. Cl.
CPC .............. *F16H 7/1263* (2013.01); *F16H 7/02* (2013.01); *F16H 2007/0842* (2013.01); *F16H 2007/0865* (2013.01); *F16H 2007/0891* (2013.01)

(58) Field of Classification Search
CPC .......... F16H 7/0827; F16H 2007/0893; F16H 2007/0806; F16H 7/1281; E05F 15/668
USPC ................................. 474/118, 119
See application file for complete search history.

(56) References Cited

U.S. PATENT DOCUMENTS

| | | | | |
|---|---|---|---|---|
| 193,394 A * | 7/1877 | Brawley | ........... | A01C 3/06 474/121 |
| 248,507 A * | 10/1881 | Robertson | ........... | F16H 7/18 474/120 |
| 258,242 A * | 5/1882 | Merritt | ........... | 474/134 |
| 268,051 A * | 11/1882 | Stevens | ........... | F16H 7/0827 474/119 |
| 367,891 A * | 8/1887 | Canning | ........... | F16H 7/0827 474/119 |
| 402,758 A * | 5/1889 | Medart | ........... | F16H 7/0827 474/119 |
| 415,268 A * | 11/1889 | Hart | ........... | F16H 7/22 474/122 |
| 429,877 A * | 6/1890 | Anderson | ........... | F16H 7/0827 474/119 |
| 694,211 A * | 2/1902 | Souhami | ........... | 474/110 |
| 820,457 A * | 5/1906 | Westover | ........... | B04B 9/08 474/119 |
| 842,808 A * | 1/1907 | McVey | ........... | F16H 7/22 474/124 |

(Continued)

*Primary Examiner* — Henry Y Liu
(74) *Attorney, Agent, or Firm* — Marshall, Gerstein & Borun LLP (57) ABSTRACT

A drive arrangement is provided which includes: a first and second rotatable members; an endless loop member, extending around the first and second rotatable members, arranged to convey drive from the first rotatable member to the second rotatable member; a first support, arranged to support the first rotatable member and the second rotatable member, having at least one aperture therein; a guide member, defining at least part of a path of the endless loop member between the first rotatable member and the second rotatable member; and a second support, arranged to support the guide member, the second support being connected to the guide member through the at least one aperture in the first support such that guide member is movable, via the at least one aperture, to engage and disengage drive from the first rotatable member to the second rotatable member.

20 Claims, 9 Drawing Sheets

(56) References Cited

U.S. PATENT DOCUMENTS

| | | | | |
|---|---|---|---|---|
| 932,000 A * | 8/1909 | Cressman | F16H 7/0827 | 474/119 |
| 936,094 A * | 10/1909 | Davidsen | F16H 7/1263 | 474/119 |
| 1,188,810 A * | 6/1916 | Mitchell | | 474/119 |
| 1,313,116 A * | 8/1919 | Rollman | A01C 3/06 | 105/105 |
| 1,354,407 A * | 9/1920 | Kocourek | F16H 7/22 | 474/113 |
| 1,425,729 A * | 8/1922 | Weightman | A01C 3/06 | 474/121 |
| 1,538,524 A * | 5/1925 | Synck | A01C 15/00 | 474/121 |
| 1,645,887 A * | 10/1927 | Wittel | G03B 19/18 | 474/119 |
| 1,721,691 A * | 7/1929 | Dennis | A01C 3/06 | 474/121 |
| 2,014,397 A * | 9/1935 | Smith | F16H 7/1254 | 474/122 |
| 2,031,319 A * | 2/1936 | Kahn | F16H 7/0827 | 16/107 |
| 2,176,431 A * | 10/1939 | Malkin | D21F 7/02 | 474/110 |
| 2,195,229 A * | 3/1940 | Smart | F16H 7/02 | 474/119 |
| 2,411,038 A * | 11/1946 | Hetteen | B66D 1/12 | 192/224 |
| 2,488,765 A * | 11/1949 | Couse | F16H 7/0827 | 474/110 |
| 2,504,624 A * | 4/1950 | Barnes | F16H 7/22 | 474/109 |
| 2,603,979 A * | 7/1952 | DuPont | F16H 7/14 | 474/113 |
| 2,696,741 A * | 12/1954 | Wilkin | F16H 7/0827 | 180/19.1 |
| 2,742,750 A * | 4/1956 | Funk | A01D 34/6806 | 474/113 |
| 2,948,374 A * | 8/1960 | Husband | F16H 9/06 | 192/135 |
| 3,306,121 A * | 2/1967 | Jenkins | F01P 5/04 | 474/117 |
| 3,550,463 A * | 12/1970 | Halls | F16H 7/0827 | 474/119 |
| 3,583,250 A * | 6/1971 | Kongelka | F16H 7/023 | 474/133 |
| 3,730,037 A * | 5/1973 | Purrer | A01D 69/00 | 241/101.71 |
| 4,036,070 A * | 7/1977 | Knight | F16H 7/0827 | 474/119 |
| 4,060,964 A * | 12/1977 | Eaves | D02G 1/0266 | 474/121 |
| 4,223,757 A * | 9/1980 | Olander | B60K 23/00 | 180/273 |
| 4,312,267 A * | 1/1982 | Shenberger | F16H 7/1281 | 100/179 |
| 4,324,552 A * | 4/1982 | Boushek, Jr. | A01D 69/00 | 474/115 |
| 4,409,779 A * | 10/1983 | Bent | A01D 34/6812 | 192/224.1 |
| 4,498,889 A * | 2/1985 | Stevens | F16H 9/14 | 474/133 |
| 4,502,375 A * | 3/1985 | Hignite | B08B 15/023 | 454/56 |
| 4,557,710 A * | 12/1985 | Greider | A01D 34/69 | 474/118 |
| 4,723,933 A * | 2/1988 | Marto | B60K 25/06 | 192/99 S |
| 4,743,225 A * | 5/1988 | Okabe | F16H 7/129 | 474/133 |
| 4,819,708 A * | 4/1989 | Onosato | A47H 5/0325 | 160/331 |
| 4,842,570 A * | 6/1989 | Niebling | F16H 7/1281 | 474/118 |
| 4,861,321 A * | 8/1989 | Siegwart, Jr. | B62M 9/16 | 474/133 |
| 4,900,294 A * | 2/1990 | Schneeberger | F16H 7/02 | 474/167 |
| 5,002,518 A * | 3/1991 | Pennatto | F16H 7/10 | 474/113 |
| 5,012,632 A * | 5/1991 | Kuhn | A01D 34/76 | 474/135 |
| 5,352,320 A * | 10/1994 | Schwartz | B65B 67/085 | 156/494 |
| 5,354,241 A * | 10/1994 | Trefz | F16H 7/0827 | 474/101 |
| 5,440,837 A * | 8/1995 | Piltingsrud | E05D 15/22 | 49/139 |
| 5,581,939 A * | 12/1996 | Regan | E05F 15/668 | 192/69.62 |
| 5,595,251 A * | 1/1997 | Cook, Jr. | B23P 19/065 | 173/178 |
| 5,611,386 A * | 3/1997 | Wang | A47H 5/0325 | 160/168.1 P |
| 5,698,073 A * | 12/1997 | Vincenzi | E05B 65/0021 | 160/188 |
| 6,089,488 A * | 7/2000 | Shimbo | G11B 15/50 | 242/356.3 |
| 6,186,915 B1 * | 2/2001 | Dietl | F16H 9/14 | 474/13 |
| 6,398,681 B1 * | 6/2002 | Wanie | F16H 7/1263 | 474/101 |
| 6,422,965 B1 * | 7/2002 | Balli | E06B 9/74 | 160/310 |
| 6,810,760 B2 * | 11/2004 | Sye | B43M 5/04 | 74/395 |
| 7,617,899 B1 * | 11/2009 | Warner | B62M 27/02 | 180/190 |
| 7,824,286 B2 * | 11/2010 | Schmid | F16H 7/1263 | 411/546 |
| 7,883,436 B2 * | 2/2011 | Mosser | F16H 7/1281 | 474/133 |
| 8,033,374 B2 * | 10/2011 | Gunton | E05F 15/603 | 160/331 |
| 8,057,335 B1 * | 11/2011 | Langenfeld | A01D 69/06 | 474/119 |
| 8,182,381 B2 * | 5/2012 | Gunton | E06B 9/70 | 160/310 |
| 8,888,625 B2 * | 11/2014 | Lehman | A01D 45/023 | 474/117 |
| 9,017,196 B2 * | 4/2015 | Gunton | E06B 9/70 | 474/133 |
| 9,939,052 B2 * | 4/2018 | Bailliu | A01F 12/56 | |
| 10,054,199 B2 * | 8/2018 | Newman | F16H 7/1281 | |
| 2006/0229151 A1 * | 10/2006 | Jansen | F16H 7/1218 | 474/117 |
| 2006/0252590 A1 * | 11/2006 | Salomon | B65H 1/00 | 474/117 |
| 2007/0125055 A1 * | 6/2007 | Ducoulombier | A01D 43/081 | 56/11.6 |
| 2007/0155558 A1 * | 7/2007 | Horst | F16H 19/06 | 474/133 |
| 2007/0155559 A1 * | 7/2007 | Horst | F16H 19/06 | 474/134 |
| 2008/0127558 A1 * | 6/2008 | Gunton | E05F 15/603 | 49/139 |
| 2011/0294614 A1 * | 12/2011 | Bigler | F16H 7/1281 | 474/133 |
| 2012/0138244 A1 * | 6/2012 | Tinklepaugh | A63J 1/02 | 160/331 |
| 2014/0051534 A1 * | 2/2014 | Wiebe | F16H 7/1281 | 474/135 |

* cited by examiner

DRIVE ARRANGEMENT

TECHNICAL FIELD OF THE INVENTION

Embodiments of the present invention relate to a drive arrangement. In particular, they relate to drive arrangement for a sectional shutter, such as a roller shutter door.

BACKGROUND

A sectional shutter is a shutter comprising a plurality of horizontal panels. An example of a sectional shutter is a roller shutter door. A drive arrangement may be provided to open and shut the sectional shutter.

BRIEF SUMMARY

According to various, but not necessarily all, embodiments of the invention there is provided a drive arrangement, comprising: a first and second rotatable members; an endless loop member, extending around the first and second rotatable members, arranged to convey drive from the first rotatable member to the second rotatable member; a first support, arranged to support the first rotatable member and the second rotatable member, having at least one aperture therein; a guide member, defining at least part of a path of the endless loop member between the first rotatable member and the second rotatable member; and a second support, arranged to support the guide member, the second support being connected to the guide member through the at least one aperture in the first support such that guide member is movable, via the at least one aperture, to engage and disengage drive from the first rotatable member to the second rotatable member by changing the path of the endless loop member between the first rotatable member and the second rotatable member.

According to various, but not necessarily all, embodiments of the invention there is provided a drive arrangement, comprising: a first and second wheels; an endless loop member, extending around the first and second wheels, arranged to convey drive from the first wheel to the second wheel; a first support plate, arranged to support the first wheel and the second wheel, having first, second and third apertures therein;

a guide wheel, defining at least part of a path of the endless loop member between the first wheel and the second wheel; a second support plate, arranged to support the guide wheel, the second support plate being connected to the guide wheel through the a first aperture in the first support plate such that guide member is translatable, via the first aperture, to engage and disengage drive from the first wheel to the second wheel by changing the path of the endless loop member between the first wheel and the second wheel; a first bearing, connected to the second support plate through the second aperture in the first support plate; and a second bearing connected to the second support plate through the third aperture in the first support plate and spaced from the first bearing in a first dimension, wherein the first bearing, second bearing, the first support plate and the second support plate are arranged to resist rotation of the guide wheel about at least a first axis, which is orthogonal to the first dimension.

According to various, but not necessarily all, embodiments of the invention there is provided examples as claimed in the appended claims.

BRIEF DESCRIPTION OF THE DRAWINGS

For a better understanding of various examples that are useful for understanding the detailed description, reference will now be made by way of example only to the accompanying drawings in which.

DETAILED DESCRIPTION OF EMBODIMENTS

FIGS. 1, 2, 3 and 4 illustrate a rear elevation, a front elevation, a rear perspective view and a front perspective view of a drive arrangement 10 in its disengaged mode. The drive arrangement 10 comprises a first support 6, a second support 8, a first rotatable member 12, a second rotatable member 14, an endless loop member 16, and a guide member 18.

The first support 6 is arranged to support the first rotatable member 12 and the second rotatable member 14. That is, the first rotatable member 12 and the second rotatable member 14 are mounted to the first support 6.

The first support 6 comprises a first support plate 6a and a second support plate 6b that are fastened to each other by fasteners 5. In this example, each of the fasteners 5 is a nut and bolt arrangement.

In the illustrated example, the first and second rotatable members 12, 14 are pulley wheels that have circumferential grooves for receiving the endless loop member 16 therebetween. The endless loop member 16 may, for example, be a belt made from natural rubber, synthetic rubber or other synthetic material. Alternatively, the endless loop member 16 may be a wire or a chain.

The endless loop member 16 is arranged to convey drive from the first rotatable member 12 to the second rotatable member 14. It extends around part of the first rotatable member 12, part of the second rotatable member 16 and part of the guide member 18.

The path of the endless loop member 16 is defined in part by a guide member 18. The guide member 18 may be a rotatable member, such as a wheel. The guide member 18 is at least partially interposed between the first rotatable member 12 and the second rotatable member 14 in the dimension defined by the y-axis of the Cartesian coordinate axes 80 in FIG. 1.

The first rotatable member 12, the second rotatable member 14 and the guide member 18 are aligned substantially in the same plane. In the example illustrated in figures the rotatable members 12, 14 and the guide member 18 are aligned in the x-y plane, as indicated by the Cartesian coordinate axes 80 in FIG. 1.

Figure 1:
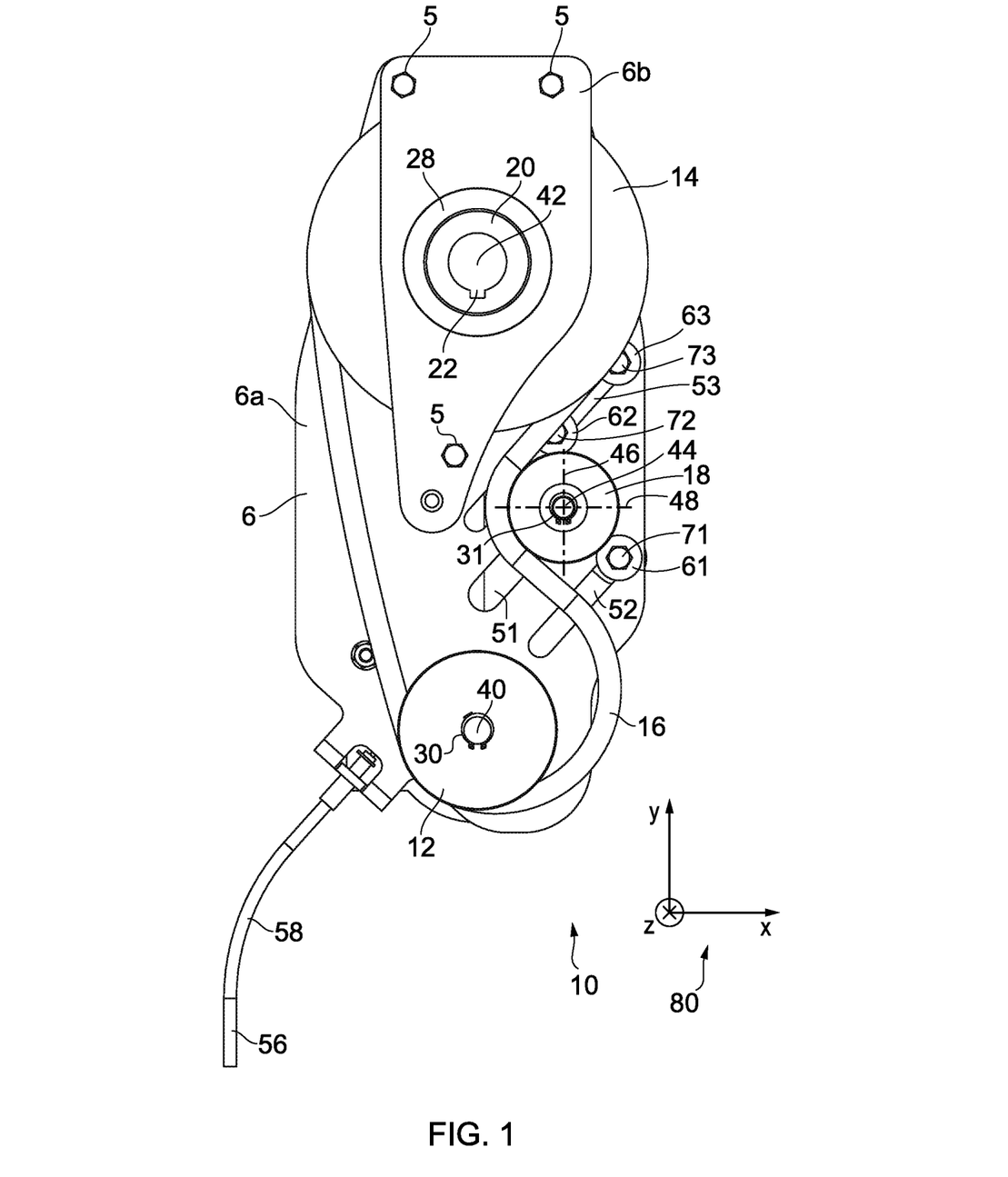
FIG. 1 illustrates a rear elevation of a drive arrangement in its disengaged mode.
Figure 2:
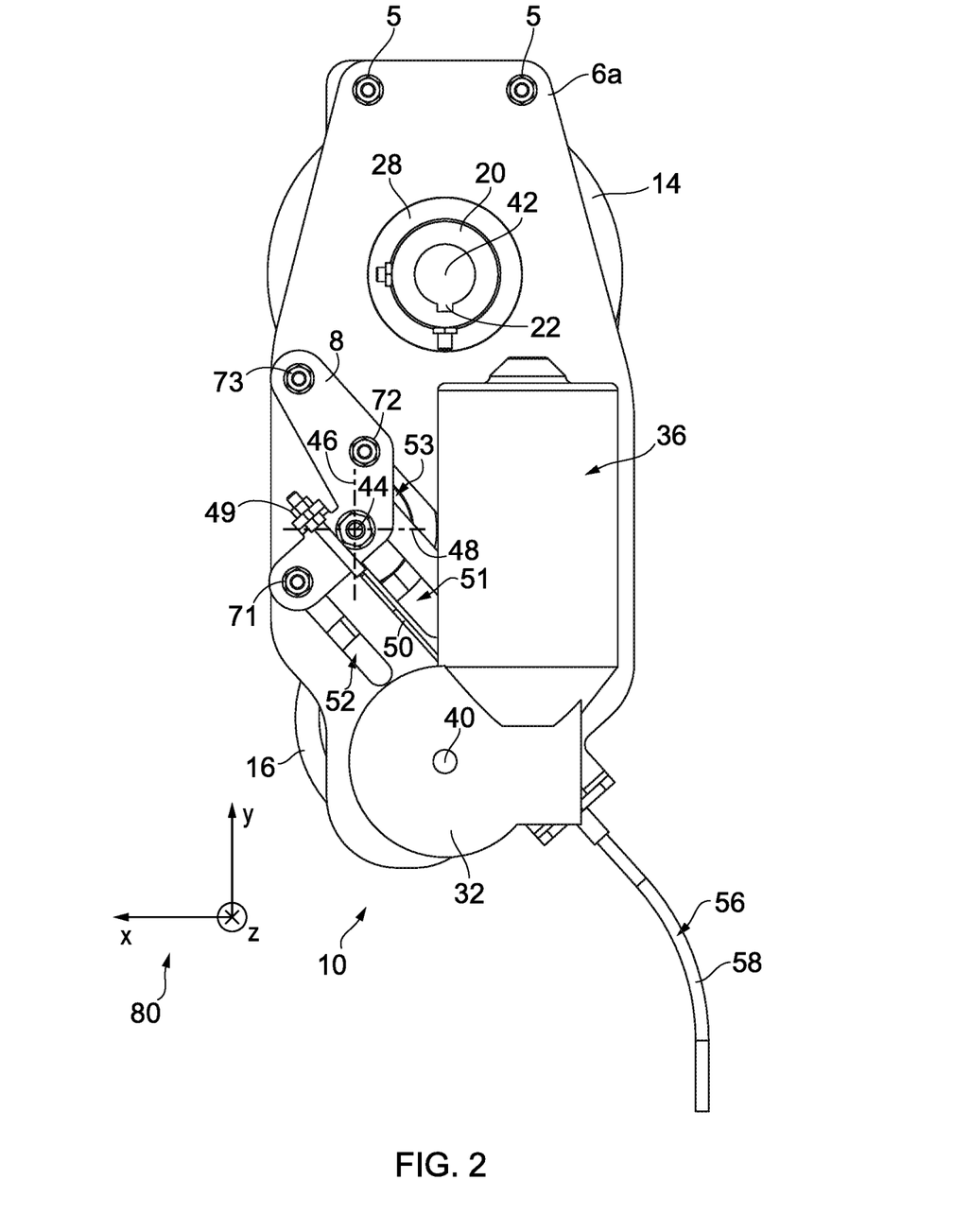
FIG. 2 illustrates a front elevation of the drive arrangement in its disengaged mode.
Figure 3:
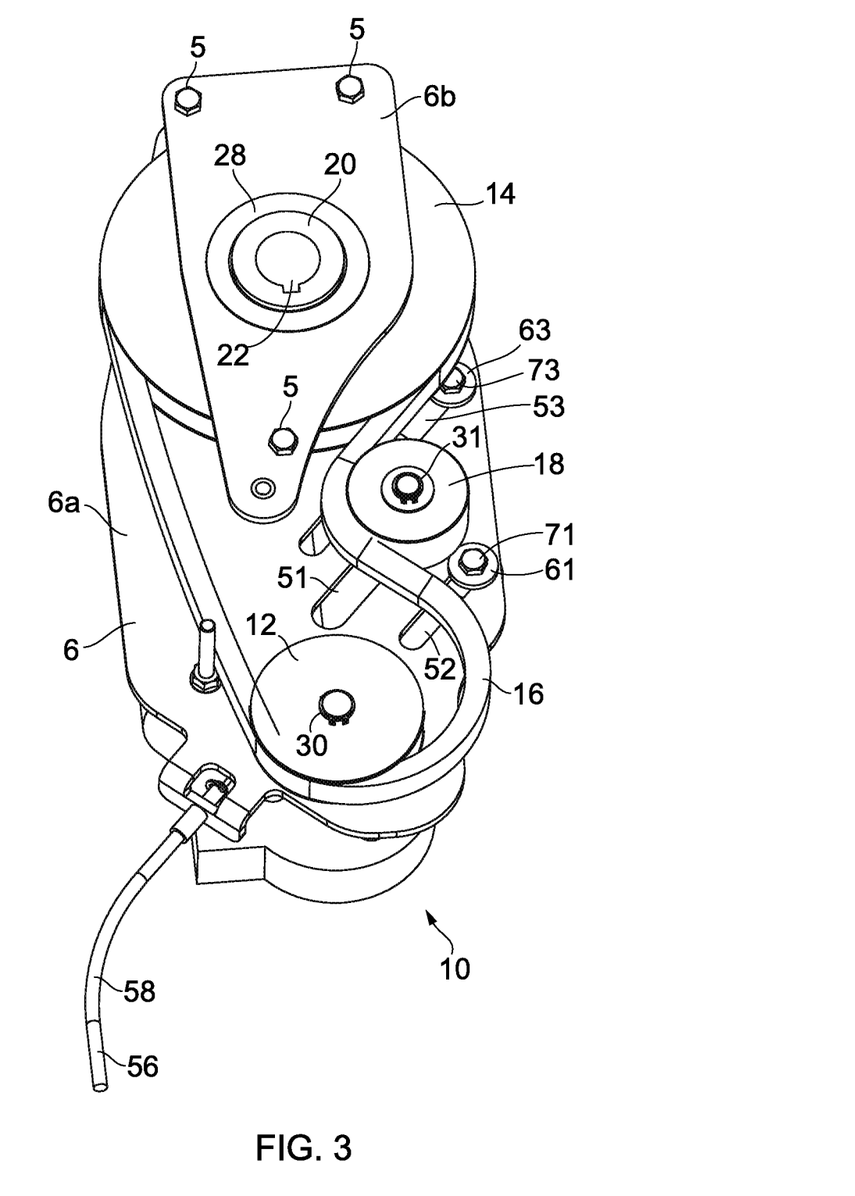
FIG. 3 illustrates a rear perspective view of the drive arrangement in its disengaged mode.
Figure 4:
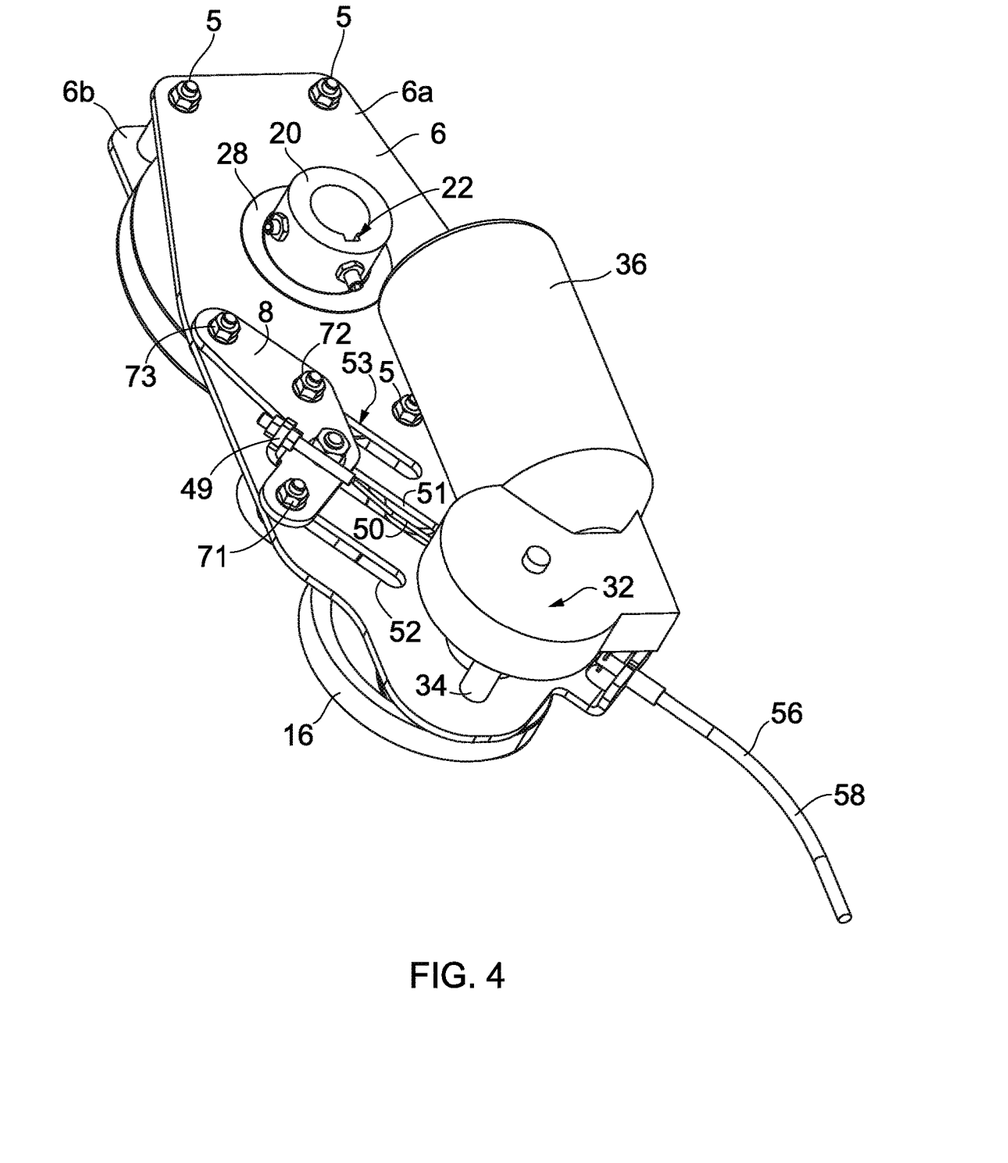
FIG. 4 illustrates a front perspective view of the drive arrangement in its disengaged mode.

Each of the first rotatable member 12, the second rotatable member 14 and the guide member 18 has an axis of rotation that is substantially aligned with the z-axis illustrated in FIGS. 1 and 2 (i.e. extending into/out of the page in FIGS. 1 and 2). The axis of rotation of the first rotatable member 12 is indicated with the reference numeral 40, the axis of rotation of the second rotatable member 14 is indicated by the reference numeral 42 and the axis of rotation of the guide member 18 is indicated by the reference numeral 44 in the figures. The axes of rotation 40, 42, 44 of the first rotatable member 12, second rotatable member 14 and the guide member 18 are substantially parallel, but not coincident.

The first rotatable member 12 is mounted on a shaft 30 in order to turn with the shaft 30. The shaft 30 is an outward shaft of a gearbox 32 (see FIGS. 2 and 4). The gearbox 32 is supported by the first support 6 because it is secured to the first support plate 6a by mounts 34 (see FIG. 4). Drive to the gearbox 32 is provided, in use, by a motor 36, which may be an electric motor. Accordingly, the electric motor 36 can drive the first rotatable member 12, through the gearbox 32.

The second rotatable member 14 is provided with a hub 20. In this example, the hub 20 has a slot 22 for keying the hub 20 (and thus the rotatable member 14) to a shaft (not shown in the figures).

The hub 20 is mounted on the first support plates 6a, 6b by means of appropriate bearings 28. The second rotatable member 14 is positioned between the first support plate 6a and the second support plate 6b in the dimension defined by the z-axis in FIGS. 1 and 2. The second rotatable member 14 is rotatably mounted to the first support 6, and is able to rotate a shaft to which the hub 20 is keyed by means of the slot 22.

The first support plate 6a of the first support 6 has first, second and third apertures 51, 52 and 53 therein. Each of the apertures provides a closed, elongate channel in the first support plate 6a of the first support 6.

The second support 8 (see FIGS. 2 and 4) supports the guide member 18 by means of a connection between the second support 8 and the guide member 18 provided by a fastener. That is, the guide member 18 is mounted to the second support 8. The guide member 18 is positioned on a shaft 31 which enables it to rotate about its axis of rotation 44. The connection between the guide member 18 and the second support 8 extends through the first aperture 51.

Figure 5:
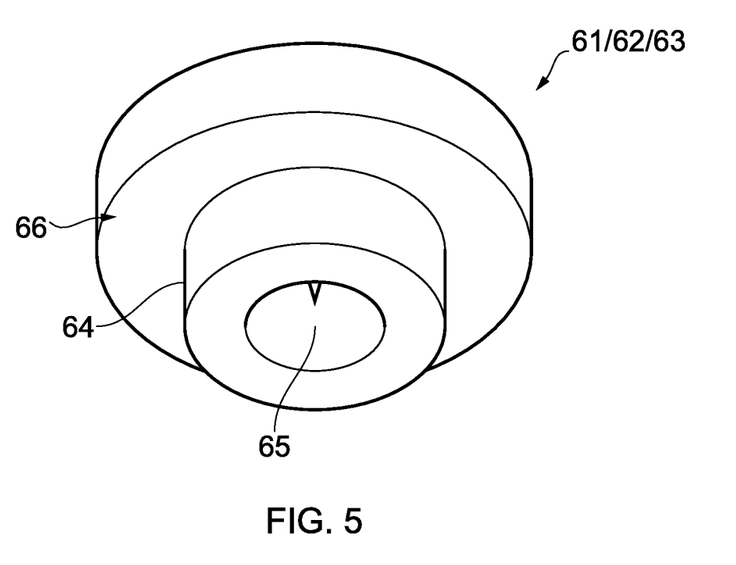
FIG. 5 illustrates an example of a bearing.
Figure 6:
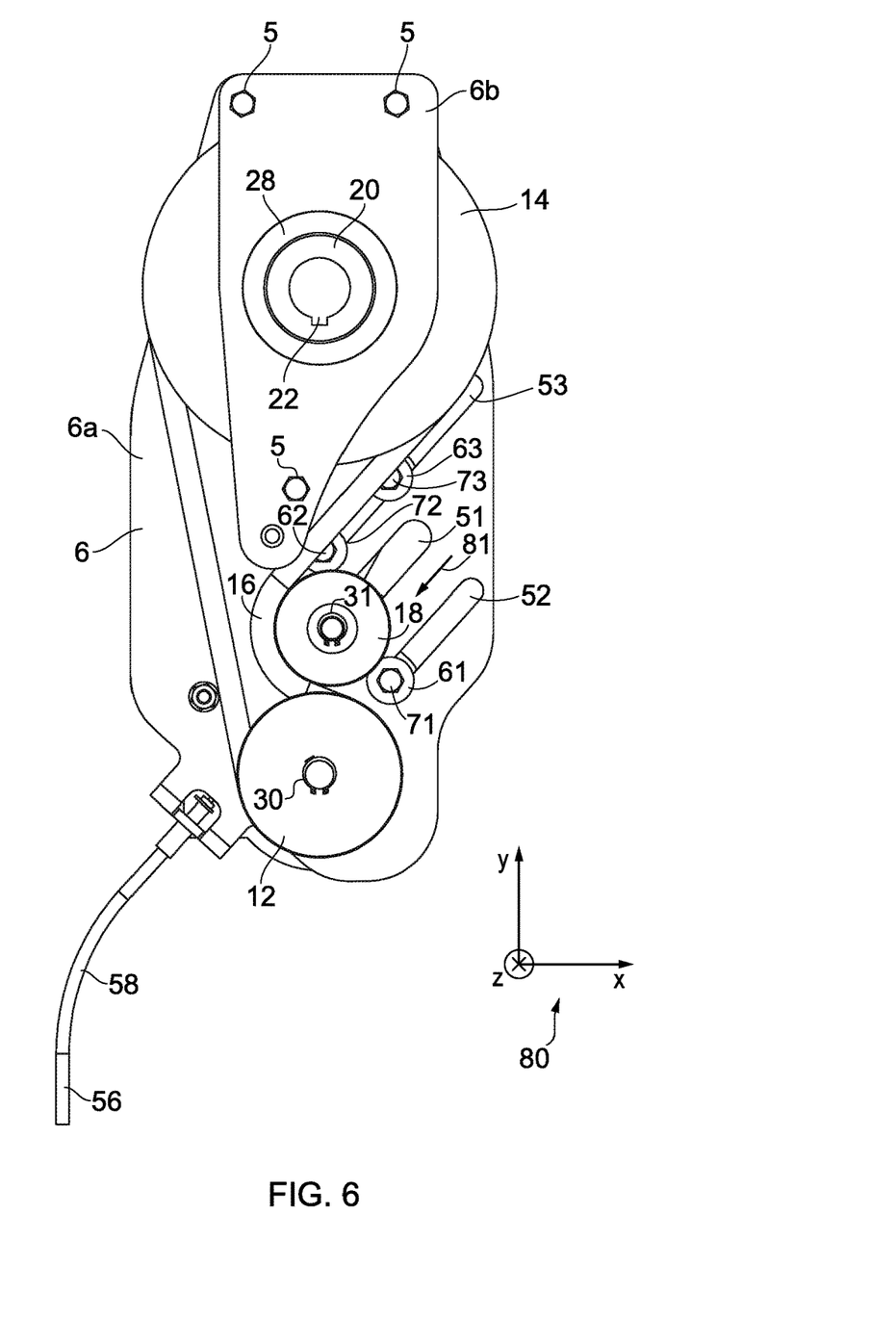
FIG. 6 illustrates a rear elevation of a drive arrangement in its engaged mode.
Figure 7:
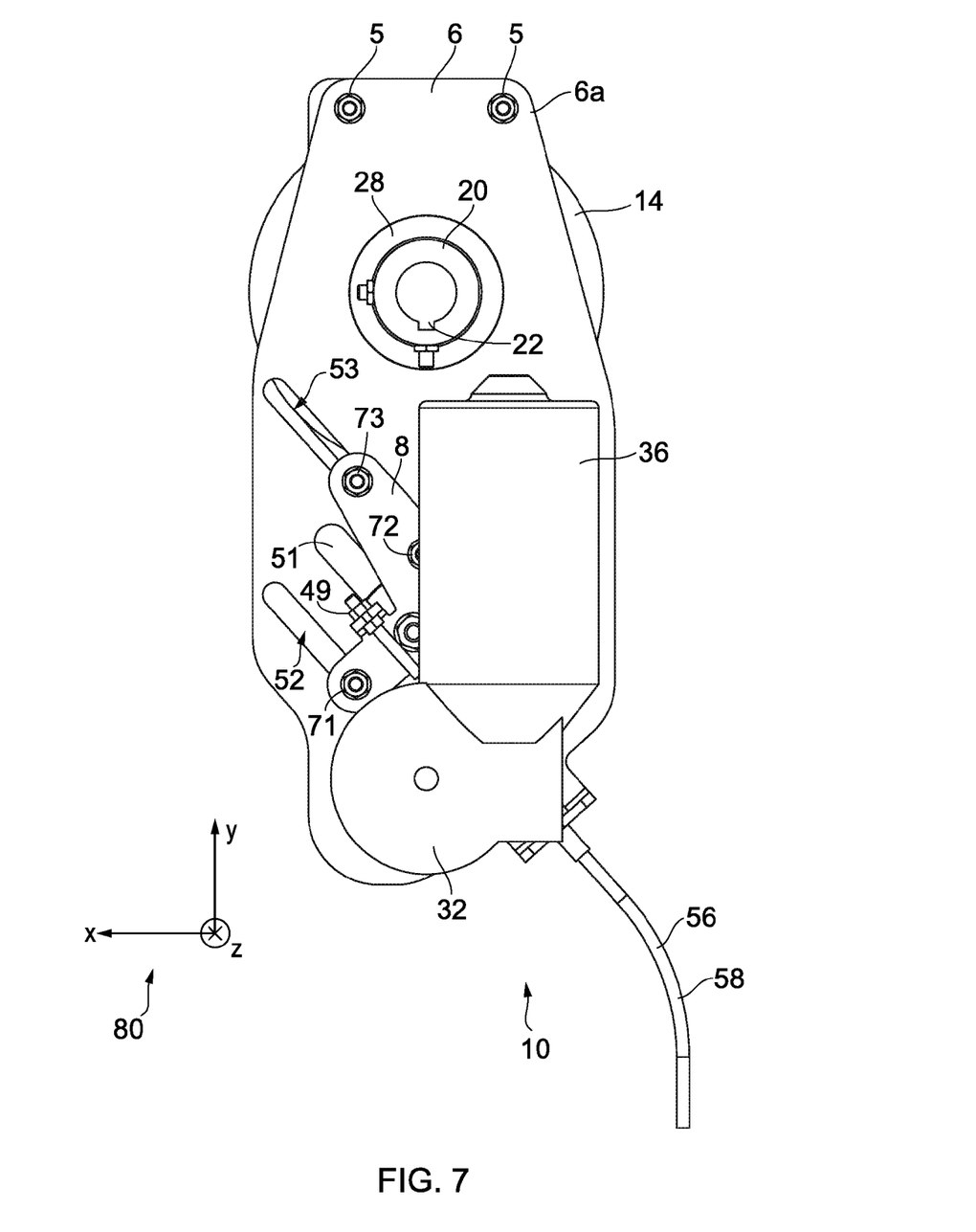
FIG. 7 illustrates a front elevation of the drive arrangement in its engaged mode.
Figure 8:
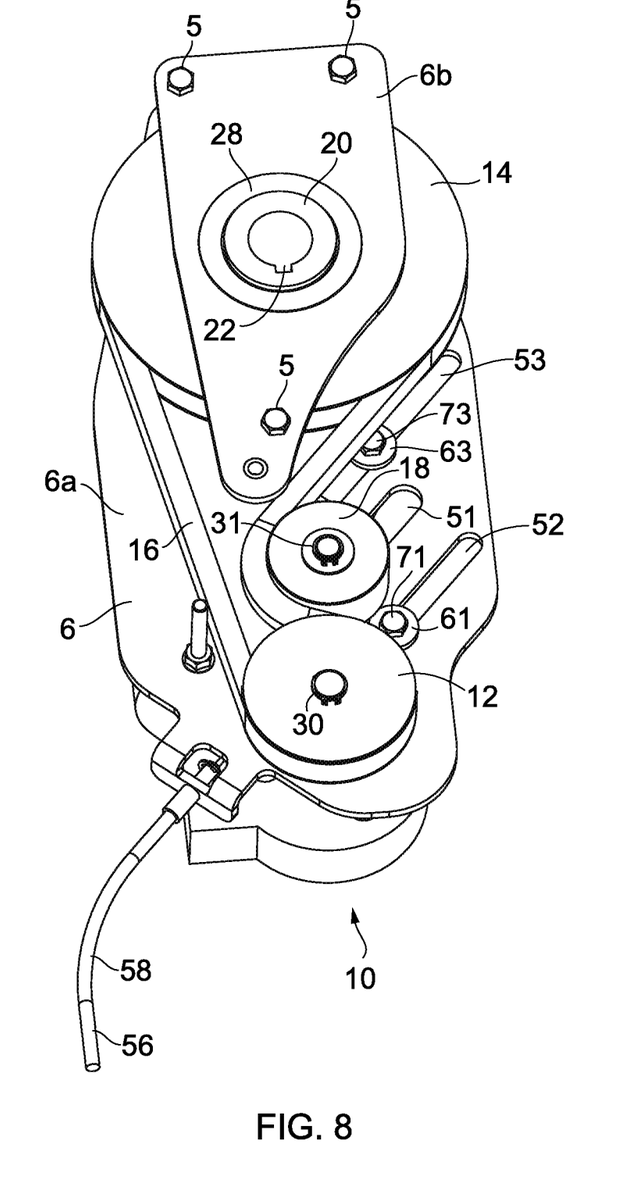
FIG. 8 illustrates a rear perspective view of the drive arrangement in its engaged mode.
Figure 9:
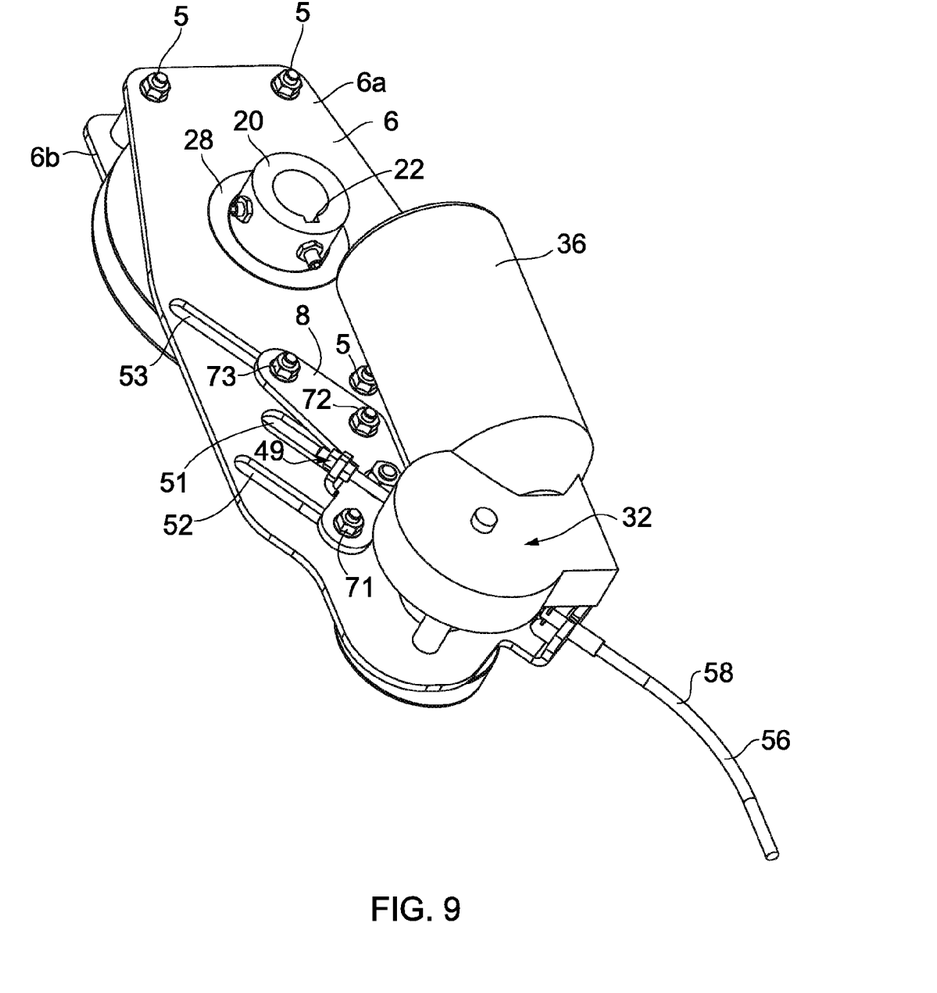
FIG. 9 illustrates a front perspective view of the drive arrangement in its engaged mode.

The drive arrangement 10 further comprises first, second and third bearings 61, 62, and 63. In this example, each of the bearings 61-63 has the same shape, as illustrated in FIG. 5. Each bearing 61-63 comprises a stem 64 and a flange 66. The stem 64 includes an aperture 65 for receiving a fastener. The illustrated flange 66 is in the shape of a circular disc and the stem 64 is cylindrical in shape. This need not be the case in every example.

The first bearing 61 is connected to the second support 8 through the second aperture 52 by a fastener 71. The fastener 71 extends through the bearing 61 and the second support 8. The first fastener 71 may, for example, be a nut and bolt arrangement.

The second and third bearings 62, 63 are connected to the second support 8 through the third aperture 53. A second fastener 72 extends through the aperture in the second bearing 62 and through the second support 8. A third fastener 73 extends through the aperture in the third bearing 63 and through the second support 8. The second and third fasteners 72, 73 may, for example, each be a nut and bolt arrangement.

Part of the flange 66 of each of the bearings 61-63 is visible in FIG. 1, but is not marked with the reference numeral 66 in FIG. 1 for clarity reasons. The stem 64 of the first, second and third bearings 61-63 extends through the first, second and third apertures 51-53 respectively. The extent of the flange 66 in the x-y plane in FIG. 1 is greater than the extent of each of the apertures, which prevents the whole of each bearing 61-63 from passing fully through each aperture 51-53.

Each of the first, second and third bearings 61-63 are spaced from one another in a first dimension, aligned with the y-axis in FIGS. 1 and 2. Each of the first and third bearings 61, 63 is spaced from the second bearing 62 in a second dimension, aligned with the x-axis in FIGS. 1 and 2.

The second support 8 is slideable relative to the (first support plate 6a of the) first support 6, via the apertures 51-53. Movement of the second support 8 relative to the first support 6 causes the guide member 18 and the bearings 61-63 to move (i.e. translate) in a direction defined by the (channels of the) apertures 51-53. It can be seen in the figures that the direction of travel of the second support 8, the bearings 61-63 and the guide member 18 has a component in two dimensions, defined by the x and y axes in FIGS. 1 and 2.

A cable 50 is fixed to the second support 8 by means of a fixing 49. In this example, the cable 50 forms part of a Bowden cable 56. The cable 50 is covered by a sheath 58.

The Bowden cable 56 provides a manual arrangement for setting the position of the guide member 18. When force is applied to the cable 50/56 which has a component in the dimension aligned with the y-axis in FIGS. 1 and 2, the shape of the apertures 51-53 results in movement of the second support 8, the bearings 61-63 and the guide member 18 in a direction defined by the apertures 51-53. The positioning of the bearings 61-63 relative to the guide member 18 remains the same when the second support 8, the bearings 61-63 and the guide member 18 are moved from one position to another along the apertures 51-53.

In FIGS. 1 to 4, a force is not being applied to the cable 50/56 by a user and the drive arrangement 10 is in its disengaged mode. In this disengaged mode, the endless loop member 16 is slack such that the rotatable members 12, 14 are not gripped tightly by the endless loop member 16. This means that the first rotatable member 12 is unable to drive the endless loop member 16 in the event that the motor 36 is driving the rotatable member 12. The second rotatable member 14 is not operationally coupled to the first rotatable member 12 and the endless loop member 16 is disabled from driving the second rotatable member 14. Consequently, a shaft keyed into the hub 20 cannot be driven by the motor 36.

In order to place the drive arrangement 10 into its engaged mode, a user applies a force (for example, a force in a vertical dimension defined by the y-axis in FIGS. 1 and 2) to the Bowden cable 56 which causes the second support 8, the bearings 61-63 and the guide member 18 to move along the apertures 51-53.

The Bowden cable 56 may then be fixed in position, for example, at its lower end, to hold the guide member 18 in position and maintain the drive arrangement 10 in its engaged mode.

FIGS. 6, 7, 8, and 9 illustrate a rear elevation, a front elevation, a rear perspective view and front perspective view respectively of the drive arrangement 10 in its engaged mode. The arrow labeled with the reference numeral 81 in FIG. 5 indicates the direction of travel of the guide member 18 when the drive arrangement 10 is transitioning from the disengaged mode to the engaged mode.

In the engaged mode, the position of the guide member 18 causes the endless loop member 16 to deflect to a greater degree than in the disengaged mode, which causes the endless loop member 16 to grip the rotatable members 12, 14 more tightly. This results in driving engagement being present between the first rotatable member 12 and the second rotatable member 14. Thus, the guide member 18 is moveable, relative to the first aperture 51, to engage and disengage drive from the first rotatable member 12 to the second rotatable member 14 by changing the path of the endless loop member 16 between the first rotatable member 12 and the second rotatable member 14.

When the drive arrangement 10 is in its engaged mode, in the event that the motor 36 drives the first rotatable member 12 using the gearbox 32 and the shaft 30, movement of the second rotatable member 14 results.

In some embodiments, the shaft that is rotated by the second rotatable member 14 may be the shaft of a sectional shutter, such as a roller shutter door. The shaft may be mounted at the top of the aperture closed by the door. Such an arrangement may be used, for example, in an automatic garage door. The drive arrangement 10 described above allows the sectional shutter/garage door to be disengaged from the motor 36 by releasing the Bowden cable 56 in a manual manner and from a remote location. Once the motor 36 has been disengaged from the door, the door may be opened by hand. This may be advantageous, for example, during a power failure or other malfunction.

When a force is applied to the Bowden cable 56 to transition the drive arrangement 10 from its disengaged mode to its engaged mode, a turning moment may be applied to the second support 8 and therefore also to the guide wheel 18 about the axes labeled with the reference numerals 46 and 48 in FIGS. 1 and 2. Each of these axes is substantially orthogonal to the axis of rotation 44 of the guide member 18. If the guide member 18 were able to rotate about the axes 46 and 48, it may cease to deflect the endless loop member 16 correctly, which could cause the drive arrangement 10 to malfunction. However, advantageously, the bearings 61-63 and the second support 8 act to resist such rotation.

In more detail, the bearings 61-63 are spaced from each other in a first dimension, defined by the y axis in FIGS. 1 and 2. The fastener that attaches the guide member 18 to the second support 8 is positioned between (at least part of) the first bearing 61 and (at least part of) the second bearings 62 and third bearing 63 in the first dimension. This means that the first bearing 61 is positioned on the opposite side of the vertical axis 48 from the second bearing 62 and the third bearing 63. The vertical axis 48 is orthogonal to the first dimension defined by the y-axis, and is parallel to the x-axis. In the event that a force is applied to the Bowden cable 56 which would act to rotate the guide member 18 about the vertical axis 48, the bearings 61-63, with the second support 8, resist rotation of the guide member 18 about the vertical axis 48. That is, the second support 8 and the flange 66 of each of the bearings 61-63 are urged in the direction of the first support plate 6a of the first support 6, on either side of the vertical axis 48, preventing rotation of the guide member 18 about the vertical axis 48.

At least part of the second bearing 62 is positioned on the opposite side of the horizontal axis 46 aligned with the y-axis in FIGS. 1 and 2. In the event that a user applies a force to the Bowden cable 56 which acts to rotate the guide member 18 about the horizontal axis 46, the bearings 61-63, with the second support 8, act to resist rotation of the guide member 18 about the horizontal axis 46. That is, the bearings 61-63 and the second support 8 are urged in the direction of the first support plate 6a of the first support 6, on either side of the horizontal axis 46, preventing rotation of the guide member 18 about the horizontal axis 46.

The bearings 61-63 and the second support 8 may, for example, prevent any rotation of the guide member 18 about the axes 46, 48 that is perceivable to the naked eye.

In summary, in embodiments of the invention a robust drive arrangement 10 is provided that may be transitioned between an engaged mode and a disengaged mode by a user, for example using a manual arrangement.

Where a structural feature has been described, it may be replaced by means for performing one or more of the functions of the structural feature whether that function or those functions are explicitly or implicitly described.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the applicant claims protection in respect of any patentable feature or combination of features hereinbefore referred to and/or shown in the drawings whether or not particular emphasis has been placed thereon.

What is claimed is:

1. A drive arrangement, comprising:
a first and second rotatable members;
an endless loop member, extending around the first and second rotatable members, arranged to convey drive from the first rotatable member to the second rotatable member;
a first support, arranged to support the first rotatable member and the second rotatable member, having at least one aperture therein;
a guide member, defining at least part of a path of the endless loop member between the first rotatable member and the second rotatable member; and
a second support, arranged to support the guide member, the second support being connected to the guide member through the at least one aperture in the first support such that guide member is movable, via the at least one aperture, to engage and disengage drive from the first rotatable member to the second rotatable member by changing the path of the endless loop member between the first rotatable member and the second rotatable member.

2. The drive arrangement of claim 1, further comprising at least one bearing connected to the second support through the at least one aperture in the first support and arranged, with the first and second supports, to resist rotation of the guide member about a first axis.

3. The drive arrangement of claim 2, wherein the at least one aperture comprises a first aperture and a second aperture, the guide member is connected to the second support through the first aperture and the at least one bearing is connected to the second support through at least a second aperture.

4. The drive arrangement of claim 2, wherein the at least one bearing comprises a first bearing spaced from a second bearing in a first dimension, the first and second bearings being connected to the second support through the at least one aperture in the first support and being arranged, with the second support, to resist rotation of the guide member about the first axis, which is orthogonal to the first dimension.

5. The drive arrangement of claim 4, wherein the guide member is rotatable about an axis which is different from the first axis.

6. The drive arrangement of claim 5, wherein the axis about which the rotatable guide member is rotatable is substantially orthogonal to the first axis.

7. The drive arrangement of claim 4, wherein the at least one aperture comprises a first aperture, a second aperture and a third aperture, the guide member is connected to the second support through the first aperture, the first bearing is connected to the second support through a second aperture and the second bearing is connected to the second support through a third aperture.

8. The drive arrangement of claim 4, wherein the at least one bearing comprises a third bearing spaced from at least one of the first bearing and the second bearing in a second dimension orthogonal to the first dimension, the third bearing being connected to the second support through the at least one aperture in the first support and being arranged, with the second support, to resist rotation of the guide member about a second axis, orthogonal to the second dimension.

9. The drive arrangement of claim 8, wherein the guide member is rotatable about an axis which is different from the second axis.

10. The drive arrangement of claim 9, wherein the axis about which the rotatable guide member is rotatable is substantially orthogonal to the second axis.

11. The drive arrangement of claim 8, wherein the at least one aperture comprises a first aperture, a second aperture and a third aperture, the guide member is connected to the second support through the first aperture, the first bearing is connected to the second support through a second aperture, the second bearing is connected to the second support through a third aperture, and the third bearing is connected to the third support through the third aperture.

12. The drive arrangement of claim 1, wherein the first support is a first support plate and the second support is a second support plate, movable relative to the first support plate.

13. The drive arrangement of claim 1, wherein the guide member is a rotatable member.

14. The drive arrangement of claim 13, wherein the first rotatable member, the second rotatable member and the guide member are rotatable about substantially parallel axes of rotation.

15. The drive arrangement of claim 1, further comprising a manual arrangement for setting the position of the guide member.

16. The drive arrangement of claim 1, wherein the manual arrangement and the at least one aperture are arranged to cause movement of the guide member, relative to the aperture, in first and second dimensions in response to the application of a force in the first dimension by a user.

17. The drive arrangement of claim 16, wherein the first dimension is a vertical dimension.

18. The drive arrangement of claim 1, further comprising a motor configured to drive the first rotatable member.

19. The drive arrangement of claim 18, wherein the drive comprises an electric motor.

20. A drive arrangement, comprising:
a first and second wheels;
an endless loop member, extending around the first and second wheels, arranged to convey drive from the first wheel to the second wheel;
a first support plate, arranged to support the first wheel and the second wheel, having first, second and third apertures therein;
a guide wheel, defining at least part of a path of the endless loop member between the first wheel and the second wheel;
a second support plate, arranged to support the guide wheel, the second support plate being connected to the guide wheel through the first aperture in the first support plate such that guide member is translatable, via the first aperture, to engage and disengage drive from the first wheel to the second wheel by changing the path of the endless loop member between the first wheel and the second wheel;
a first bearing, connected to the second support plate through the second aperture in the first support plate; and
a second bearing connected to the second support plate through the third aperture in the first support plate and spaced from the first bearing in a first dimension, wherein
the first bearing, second bearing, the first support plate and the second support plate are arranged to resist rotation of the guide wheel about at least a first axis, which is orthogonal to the first dimension.

* * * * *